United States Patent [19]

Sheaffer

[11] Patent Number: 5,909,573
[45] Date of Patent: *Jun. 1, 1999

[54] METHOD OF BRANCH PREDICTION USING LOOP COUNTERS

[75] Inventor: Gad S. Sheaffer, Haifa, Israel

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/623,486

[22] Filed: Mar. 28, 1996

[51] Int. Cl.⁶ .................................................. G06F 9/38
[52] U.S. Cl. .......................................... 395/587; 395/588
[58] Field of Search .............................. 395/572, 421.03, 395/571, 584, 585, 586, 587, 392, 800.23, 588

[56] References Cited

U.S. PATENT DOCUMENTS

| | | | |
|---|---|---|---|
| 3,551,895 | 12/1970 | Driscoll, Jr. | 395/584 |
| 4,370,711 | 1/1983 | Smith | 395/587 |
| 4,764,861 | 8/1988 | Shibuya | 395/383 |
| 4,882,701 | 11/1989 | Ishii | 395/588 |
| 5,297,281 | 3/1994 | Emma et al. | 395/392 |
| 5,367,703 | 11/1994 | Levitan | 395/800.23 |
| 5,584,001 | 12/1996 | Hoyt et al. | 395/585 |
| 5,758,142 | 5/1998 | McFarling et al. | 395/586 |

FOREIGN PATENT DOCUMENTS 62-114034  5/1987  Japan ............................. 9/38

OTHER PUBLICATIONS

Fagin, Barry, The Performance of Counter and Correlation Based Schemes for Branch Target Buffers, IEEE, pp. 1383–1393, Dec. 1995.

Gonzalez et al., Branch Mechanism for Program Loops, IBM Technical Disclosure, pp. 4569–4571, Feb. 1983.

IBM Technical Disclosure, (2 N+1)–State Branch Target Buffer Design, pp. 116–118, Jan. 1993.

*Primary Examiner*—Richard L. Ellis
*Assistant Examiner*—Patrice L. Winder
*Attorney, Agent, or Firm*—Blakely, Sokoloff, Taylor & Zafman LLP

[57] ABSTRACT

To increase the efficiency of a pipelined microprocessor, branch prediction is often implemented. Many branch instructions are used to implement program loops with a fixed number of iterations. To accurately predict the branching behavior of branch instructions used to implement program loops a counter based branch prediction system is suggested. The counter based branch prediction system is based on acquiring a final loop count at run time. The final loop count specifies the number of iterations the loop will perform such that the final loop count is used to predict the branching behavior of the branch instruction used to implement the program loops. Three methods for acquiring a final loop count are proposed. Using the suggested counter-based branch prediction method improves the branch prediction rate of the loop related branch instructions and the overall average prediction rate. As a result, this enables the design of higher performing computer pipelines.

7 Claims, 9 Drawing Sheets

| TAG ADDRESS | BRANCH TYPE | TARGET ADDRESS | HISTORY | FINAL COUNT | COUNTER |
|---|---|---|---|---|---|
| | | | | | |
| | | | | | |
| | | | | | |
| | | ↓ | | | |
| | | | | | |
| | | | | | |
| | | | | | |

FIG. 3a

| TAG ADDRESS | BRANCH TYPE | TARGET ADDRESS | BRANCH HISTORY OR FINAL COUNT AND COUNT |
|---|---|---|---|
|  |  |  |  |
|  |  |  |  |
|  |  | ↓ |  |
|  |  |  |  |
|  |  |  |  |
|  |  |  |  |

FIG. 3b

METHOD OF BRANCH PREDICTION USING LOOP COUNTERS

FIELD OF THE INVENTION

This invention relates to the field of branch prediction mechanisms for computer processors. Specifically, the invention relates to a branch prediction mechanism that maintains a counter of loop iterations.

BACKGROUND OF THE INVENTION

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waited until all the previous logic blocks complete operations before beginning its operation.

To improve efficiency, microprocessor designers overlapped the operations of the fetch, decode, execute, and writeback processing stages such that the microprocessor operated on several instructions simultaneously. In operation, the fetch, decode, execute, and writeback processing stages concurrently process different instructions. At each clock tick, the result of each processing stage is passed to the following processing stage. Microprocessors that use the technique of overlapping the fetch, decode, execute, and writeback stages are known as "pipelined" microprocessors. Some microprocessors further divide each processing stage into substages for additional performance improvement. Such processors are referred to as "deeply pipelined" microprocessors.

In order for a pipelined microprocessor to operate efficiently, an instruction fetch unit at the head of the processing pipeline must continually provide the pipeline with a stream of microprocessor instructions. However, conditional branch instructions within an instruction stream prevent the instruction fetch unit from fetching subsequent instructions until the branch condition is fully resolved. In pipelined microprocessor, the branch condition will not be fully resolved until the branch instruction reaches an instruction execution stage near the end of the microprocessor pipeline. Accordingly, the instruction fetch unit of the microprocessor will stall because the unresolved branch condition prevents the instruction fetch unit from knowing which microprocessor instructions to fetch next.

To alleviate this problem, most pipelined microprocessors implement a branch prediction mechanism that predicts the existence and the outcome of branch instructions within an instruction stream. The instruction fetch unit uses the branch predictions to determine which instructions should be fetched after a branch instruction. For example, Yeh & Patt introduced a highly accurate two-level adaptive branch prediction mechanism. (See Tse Yu Yeh and Yale N. Patt, *Two-Level Adaptive Branch Prediction*, The 24th ACM/IEEE International Symposium and Workshop on Microarchitecture, November 1991, pp. 51–61)

To predict the outcome of branch instructions, most branch prediction mechanisms collect branch "histories" that store the outcome of recent occurrences of each branch. For example, a branch prediction mechanism may store the outcome (taken or not-taken) of the last k occurrences of a particular branch. The branch history is stored in a branch target buffer along with a tag address for identifying the location of the branch instruction and a target address for identifying the branch target destination.

When a branch prediction mechanism predicts the outcome of a branch instruction and the microprocessor executes subsequent instructions along the predicted path, the microprocessor is said to have "speculatively executed" along the predicted instruction path. During speculative execution the microprocessor is performing useful processing only if the branch instruction was predicted correctly. However, if the branch prediction mechanism mispredicted the branch instruction, then the microprocessor is speculatively executing instructions down the wrong path and therefore accomplishes nothing useful. When the microprocessor eventually detects that the branch instruction was mispredicted, the microprocessor must flush all the speculatively executed instructions and restart execution at the correct address.

Since the microprocessor accomplishes nothing when a branch instruction is mispredicted, it is very desirable to accurately predict branch instructions. This is especially true for deeply pipelined microprocessors wherein a long instruction pipeline will be flushed each time a branch misprediction is made. This presents a large misprediction penalty.

Studies of branch behavior have indicated that program loops are not predicted well by history pattern based predictors. It would therefore be desirable to have an improved branch prediction mechanism that would predict the behavior of branch instructions in program loops.

SUMMARY AND OBJECTS OF THE INVENTION

It is therefore an object of the present invention to provide a branch prediction mechanism targeted at branch instructions that implement program loops.

This and other objectives are achieved by the counter-based branch prediction system of the present invention. The counter based branch prediction system acquires a final loop count for each program loop to be predicted. The final loop count specifies the number of iterations the loop will perform such that the final loop count is used to predict the branching behavior of the branch instruction used to implement the program loops. Three different methods for acquiring a final loop count are proposed: dynamic run-time loop determination, run-time detection of a final loop count location, and architectural support via hint instructions.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

FIG. 3a illustrates an embodiment of the branch target buffer of a branch prediction mechanism with a counter based loop predictor. FIG. 3b illustrates another embodiment of the branch target buffer of a branch prediction mechanism with a counter based loop predictor.

DETAILED DESCRIPTION

Methods and apparatus for implementing counter based branch prediction for loops are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Program Loops

Figure 1:
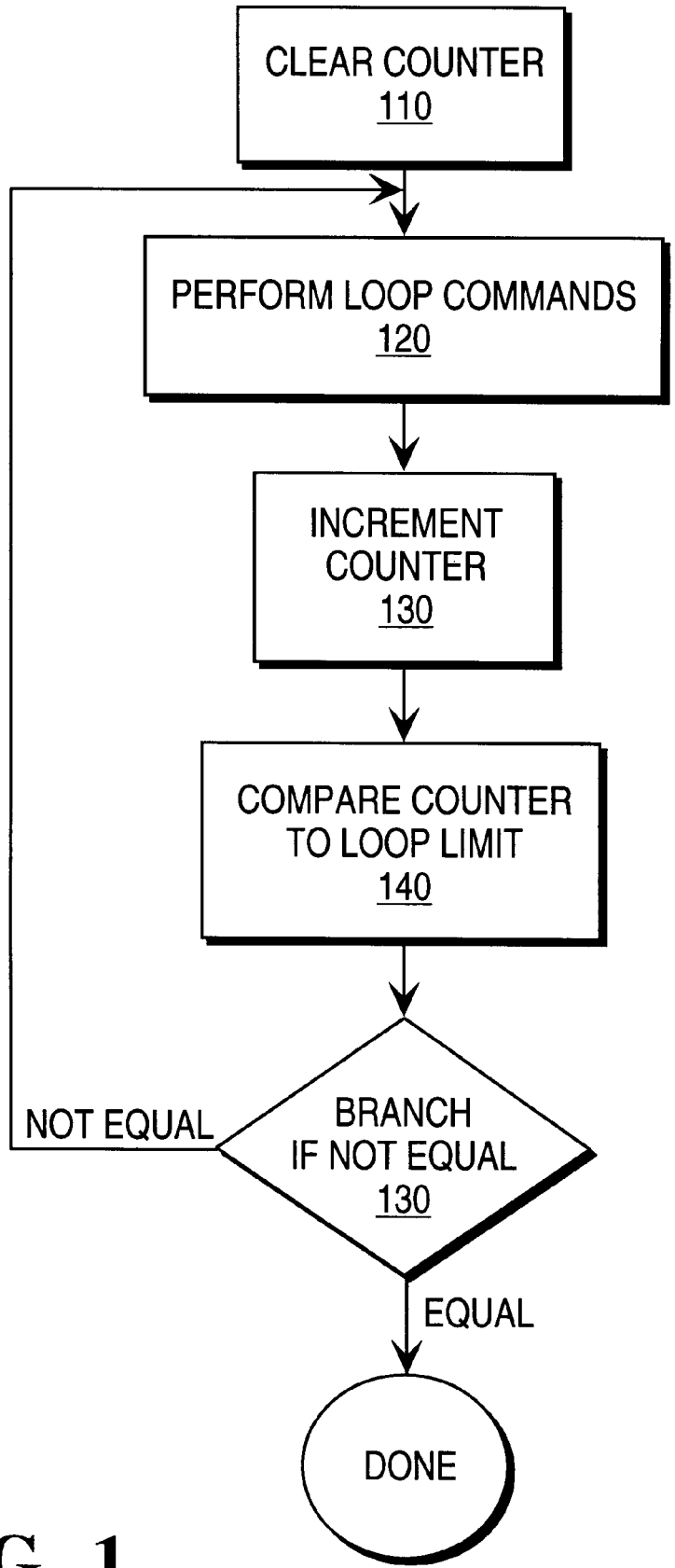
FIG. 1 illustrates a flow diagram of a common program loop that counts upwards.

FIG. 1 illustrates a flow diagram of a typical program loop. The first step, step 110, is to clear a loop counter. The loop counter will be used to count the iterations of the loop. The next step is to perform the loop commands at step 120. The loop commands consist of a set instructions that the programmer wants executed multiple times. Then, at step 130, the loop counter is incremented. At step 140, the loop counter is compared with some value indicates the number loop iterations to be performed. If the loop counter equals the number of loop iterations, then the loop is done. Otherwise, the program control branches back up to step 120 where the loop commands are executed again.

Figure 2:
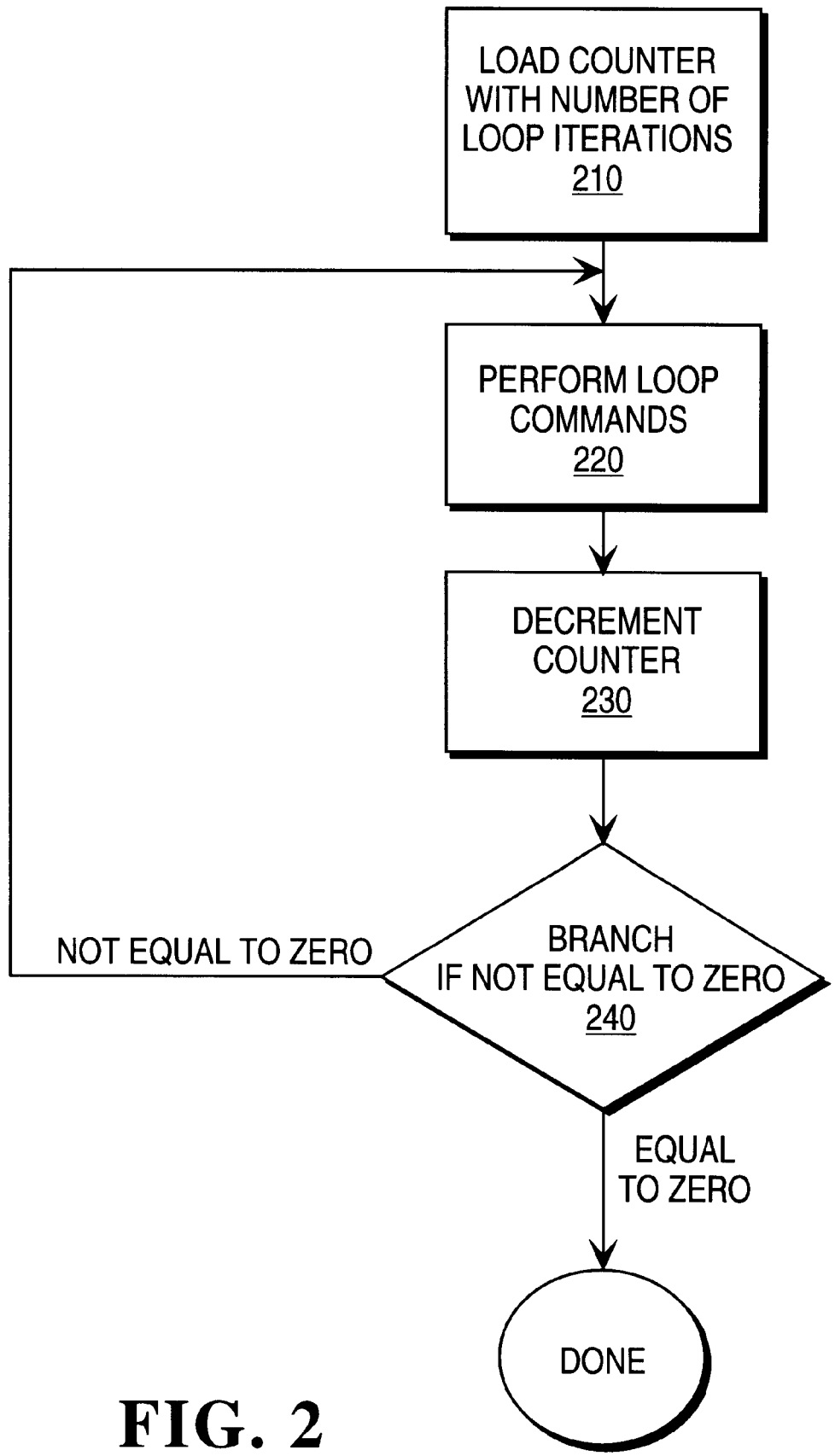
FIG. 2 illustrates a flow diagram of a common program loop that counts downwards.

Program loops come in many variations. FIG. 2 illustrates a common variation of a program loop. In the program loop of FIG. 2, a loop counter value is loaded with the number of loop iterations at step 210. Next, the set of loop commands are performed at step 220. After the loop commands have been performed, the loop counter is decremented at step 230. The loop counter is tested at step 240 and if the loop counter is not zero, then program control loops back up to step 220 to perform the loop commands again. When the loop counter reaches zero, the program continues along a straight path.

Program loops such as those illustrated in FIG. 1 and FIG. 2 occur many times within most computer programs. To improve branch prediction in a microprocessor, the present invention suggests a dedicated loop based branch prediction scheme. Specifically, a loop based branch prediction mechanism would maintain a final loop count value that consist of the number of iterations a loop performs and a loop counter that would count the iterations of a loop as it occurred. The potential of the counter based prediction scheme is based on the assumption that for a given program loop, the loop count is invariable in a large percentage of the instances of the program loop.

Loop Predictions by a History Pattern Predictor

Most existing branch prediction mechanisms collect a limited history of previous branch outcomes and make branch predictions based upon the collected branch history. The branch history pattern-based Tse-Yu branch predictor effectively handles only loops with very short loop counts, depending on the number of history bits used. Loop counts of up to the number of history bits plus one are perfectly predicted if the loop count does not change. For example, a 4 bit history register can predict loops with a loop count of up to 5. Longer loops incur a single misprediction on the loop exit. If this single misprediction is amortized across a large number of loop iterations per instance, the overall prediction rate is still very good. However, if the loop count is larger than the length of the history pattern but not very large, the prediction rate is quite low. In 4 bit history predictor, a loop executing 6 times has a prediction rate of 83.3%, even if the loop count is fixed. The prediction rate for loops longer than the history pattern the same as the static prediction rate, and is easily calculated by:

Prediction rate=(Loop_count−1)/Loop_count

Loops Handling by a Counter Based Predictor

A counter based predictor aims to augment the pattern-history predictor for loop related branches. A counter based predictor may static prediction for the first instance of a loop, incurring one misprediction when the loop is exited. Alternatively, some implementations of a counter based branch prediction system may determine the number of loop iterations even before a program loop is first executed.

After obtaining the number of iterations a loop will make (final loop count), the counter based predictor has perfect prediction when the loop count of the current instance is equal to the loop count of the previous instance of the same loop. If the loop count of the current instance is larger than the previous loop count, two mispredictions will occur: once when the counter reaches zero and the loop exit is incorrectly predicted and another one when the real loop exit is finally reached. Branch instructions within loops with a loop count shorter than the previous count will incur a single misprediction upon the loop exit. Thus, branch instructions within loops with a loop count shorter than the previous count have the same prediction rate as branch instructions that are predicted using static prediction.

A Comparison of the Loop Prediction Rates

The following table lists the branch prediction rates for a branch history pattern-based branch prediction system, a counter-based branch prediction system, and a static branch prediction system.

| SPEC Program | Prediciton rate for different Branch Prediction Mechanisms | | | Pattern mispredictions eliminated by a counter-based scheme |
| --- | --- | --- | --- | --- |
| | counter-based | pattern-based | Static | |
| compress | 83.39% | 83.94% | 83.87% | −3.42% |
| eqntott | 99.64% | 97.13% | 94.03% | 87.46% |
| espresso | 98.84% | 96.60% | 86.67% | 65.88% |
| gcc | 93.07% | 92.11% | 85.95% | 12.17% |
| li | 68.67% | 68.74% | 48.07% | −0.22% |
| sc | 99.56% | 92.29% | 84.34% | 94.29% |
| ear | 100.00% | 98.48% | 98.48% | 100.00% |
| alvinn | 100.00% | 97.57% | 97.57% | 100.00% |
| mean | 89.75% | 87.87% | 78.73% | 15.50% |

As illustrated by the preceding table, loops in integer programs are not well predicted by existing pattern-based branch prediction mechanisms or static predication. Storing final loop count is a more efficient encoding of the history of loop based branches than a stream of taken/not taken bits used in the branch history pattern-based (Tse-Yu) algorithm. However, the counter based loop branch prediction system is best used only for loop related branches such that a counter based loop prediction mechanism should be used to augment a pattern based prediction mechanism instead of replacing it.

A Counter Based Branch Prediction Mechanism

FIG. 3a illustrates the entries for one embodiment of a branch target buffer that performs both branch history pattern-based (Tse-Yu) branch prediction and counter based branch prediction. The first field is a tag address. The tag address is used to identify the location of an associate branch instruction in memory. The second field is a branch type field. If the branch instruction is determined to be from a program loop, then the branch type is set such that the branch history is ignored and the final count and counter are used to make branch predictions. The third field is a branch target address. The branch target address is the address that the program will branch to if the branch instruction is predicted taken. The fourth field is a branch history field The branch history field stores the taken/not-taken history for the last n instances of that branch instruction. The fifth field is a final count field. The final count is the number of iterations the loop last performed. The sixth field is the counter field. The counter field is used to store a temporary loop counter while a loop is being executed.

FIG. 3b illustrates a second embodiment of a branch target buffer that performs both branch history pattern-based (Tse-Yu) branch prediction and counter based branch prediction. In the embodiment of FIG. 3b, the final field either stores a branch history or a final count and counter. If the branch type indicates a program loop, then the final field contains a final count and counter. Otherwise, the final field contains a history of the previous occurrences of the branch instruction.

When the branch type field is not set to loop, then the branch target buffers of FIGS. 3a and 3b operate like existing pattern-based branch prediction mechanisms. A description of a pattern based branch prediction mechanisms can be found in the patent entitled "Method and Apparatus for predicting Branches in a CISC processor", Ser. No. 08/177,155, filed Jan. 4, 1994. issued Nov. 12, 1996, U.S. Pat. No. 5,574,871.

When the branch type field indicates a program loop, the branch target buffer of FIGS. 3a and 3b predicts the behavior of the branch instruction using the final count and counter fields. When the number of iterations that the loop performs is first determined, that "loop count" is stored in the final count field, the branch type is set to indicate a loop, and the counter field is cleared. (The methods for determining the loop count will be explain in the next section). The next time the branch instruction that is part of a loop is encountered, the counter will be incremented. If the counter in the counter field is less than or equal to the value in the final count field, then the branch prediction mechanism branches to the address specified in the target address field. Otherwise, if the counter exceeds the value in the final count field, then the processor proceeds to the instruction after the branch instruction and clears the counter in the counter field. Both the counter incrementing and the comparison are done in the early stages of a microprocessor pipeline such that the outcome of the loop branch instruction can be predicted without creating gaps in the instruction stream within the microprocessor pipeline.

If a misprediction is detected when using counter-based branch prediction, then the loop count may be adjusted. Alternatively, the branch type for that branch target buffer entry will be changed such that pattern-based branch prediction will be used.

Determining the Loop Count

As previously mentioned, the number of iterations that a program loop performs must be determined for a loop counter based prediction mechanism to operate. The present invention proposes three different methods for determining the final loop count for a loop: previous loop occurrences, run-time loop detection, and loop count location with architectural support. Using any of these methods, the final loop count can be found and placed into the final count field of FIG. 3. As explained above, the final loop count is used to predict the outcome branch instructions that implement loops by counting loop iterations and comparing the intermediate loop iteration count (counter) with the known final loop count.

1. Dynamic Determination of Final Loop Count from Previous Loop Instances

The first method of determining the final loop count is to identify existence of a program loop and then determines the number of iterations that occur for that program loop. Determining a final loop count from a previous instance of a loop and using the final loop count to predict future occurrences of the loop count is based on the assumption that for a given program loop, the loop count is remains constant for a large percentage of the program loop instances.

Determining a final loop count from previous loop instances operates as follows. When a conditional branch instruction with a taken backward branch is first encountered, the loop identifying circuitry is activated. The loop identifying circuitry determines if the final count in the branch target buffer is 0. If it is zero then the loop counter is cleared and 1 is added to it and the branch is taken back. Each time the conditional instruction branches backwards, the processor should add 1 to the loop counter. When the loop has terminated (all loop iterations have executed), the counter that was counting loop iterations is stored into the branch target buffer as the final loop count for the next loop instance and the branch type is set to indicate a loop.

Partial Architectural Support

To augment the dynamic method of determining a final loop count, Architectural support can be added the hardware. For example, a hint could be placed in the instruction stream, indicating a specific branch to be loop related. The hint would enable the implementation to apply the counter based predictor circuitry to that branch instruction.

There are a number of benefits in having architectural support. For example, a the branch type would only indicate a loop for branch instructions that are better predicted by counter based loop predictor. In an alternate embodiment where the loop branches are stored separately, then the entries in the loop branch target buffer prediction mechanism are not consumed by branches that do not benefit from it, leaving more space for branches that do. Furthermore, architectural support allows accumulating loop count history from the first instance of that loop.

2. Run-Time Detection of a Final Loop Count Location

Dynamic run time detection of a memory location containing a final loop count is feasible. The location of the final loop count can be deduced from run-time hardware analysis of the instruction stream. Specifically, identifying certain instruction sequences can reveal the location of a value that stores the number of iterations of the loop. By capturing the value from that location, the final loop count field of the branch target buffer can be filled.

Figure 4A:
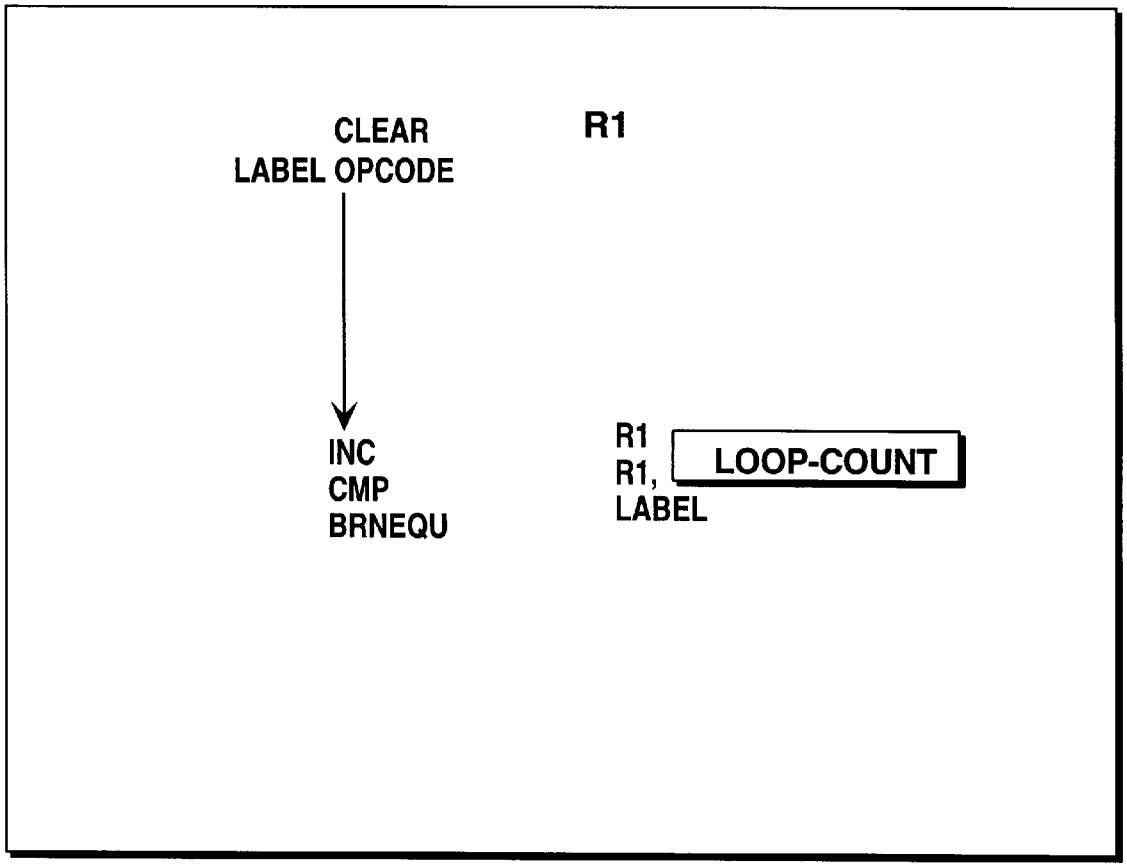
FIG. 4a lists a count up program loop.
Figure 4B:
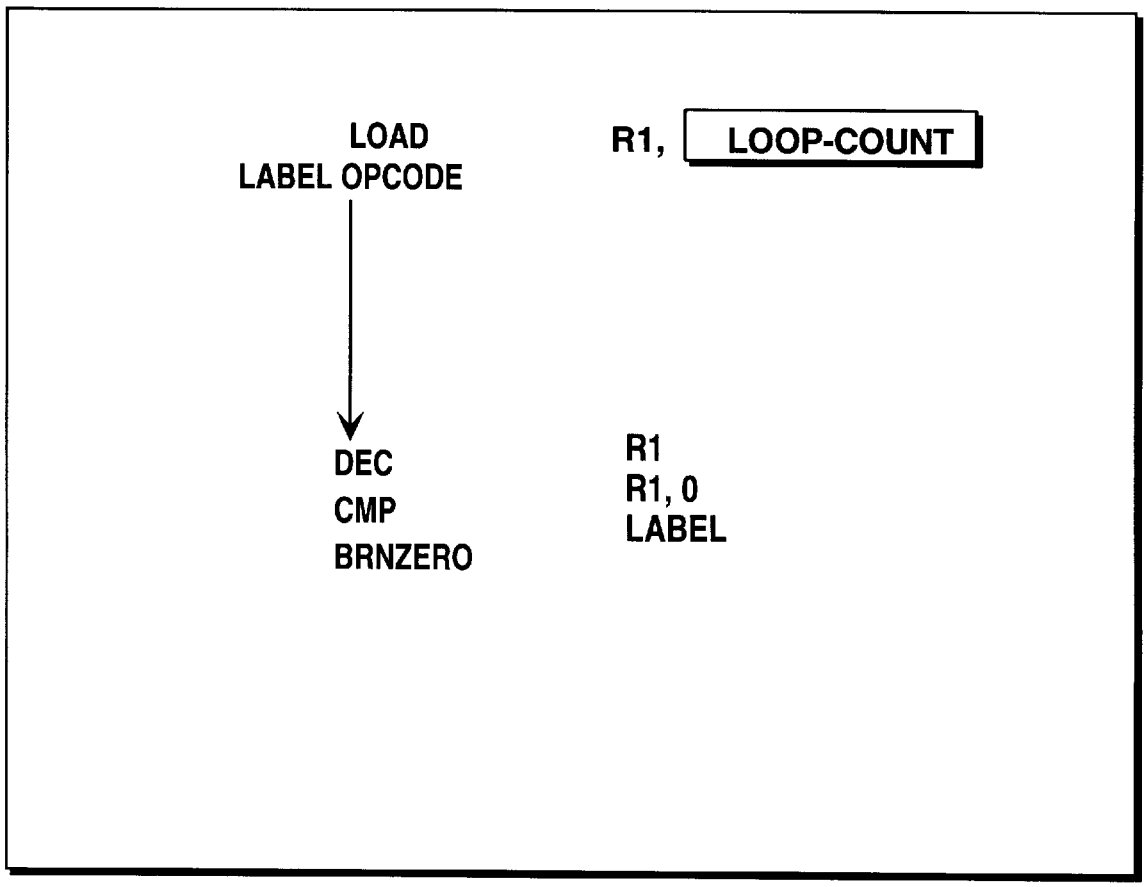
FIG. 4b lists a count down program loop.

Frequent sequences of 2–3 instructions that modify the loop counter, check the loop exit condition and branch accordingly can be identified at run time, by hardware. FIGS. 4a and 4b, illustrate examples of simple program loops written in a hypothetical assembly language. The loop program of FIG. 4a represents a count up program loop. Specifically, a register that will serve as a loop counter is cleared at the beginning of the loop. Near the end of the loop, the register is incremented and compared with an immediate value. If the register does not equal the immediate value, then the program loops back for another iteration. In this simple loop program, the immediate value that is compared to at the end of the loop can be used as the final loop count value.

FIG. 4b illustrates a similar case except that FIG. 4b represents a count down program loop. In the loop of FIG. 4b, a register is loaded with a loop iteration value. Then, near the end of the loop, the register is decremented and tested to see if it is zero. If the register is not zero, then the program loops back for another iteration. In this loop program, the value that is loaded into the loop counter register at the beginning of the loop can be used as the final loop count value.

Figure 5A:
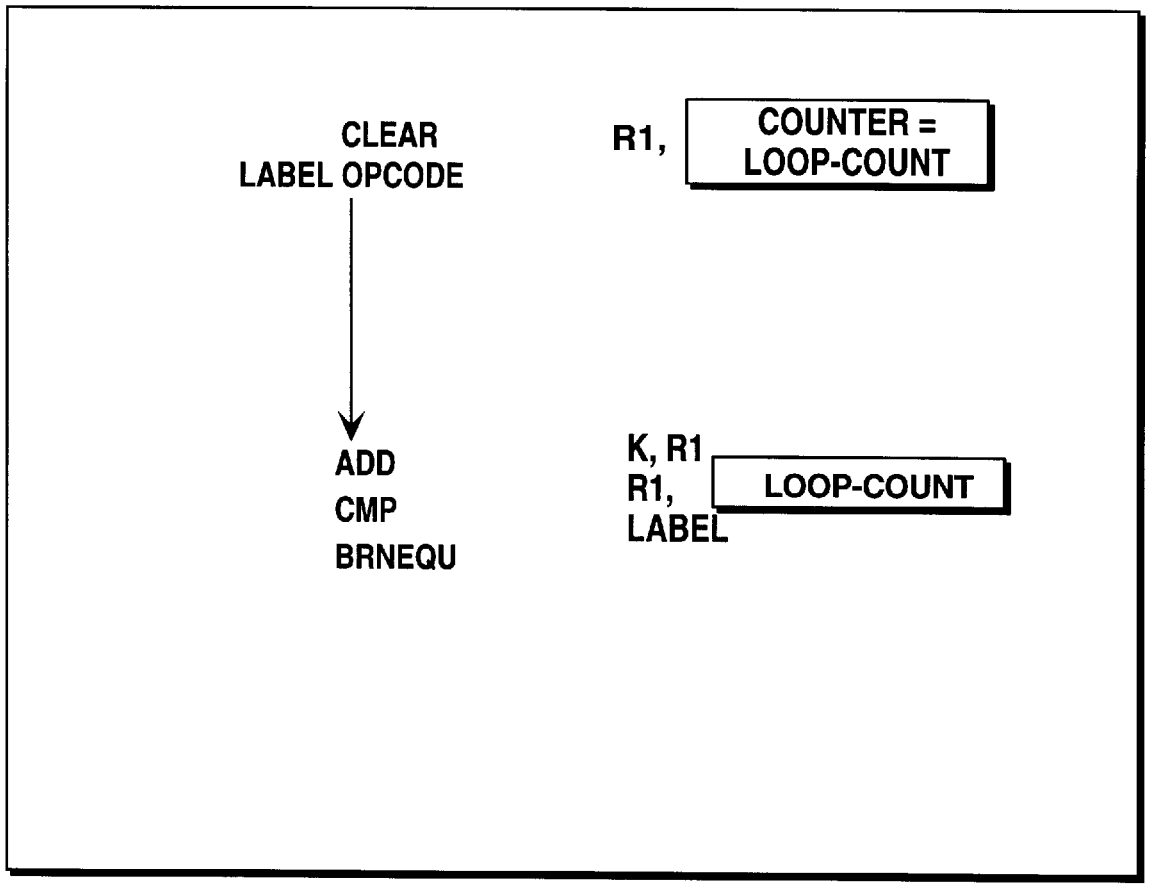
FIG. 5a lists a count up program loop that counts by adding a constant.
Figure 5B:
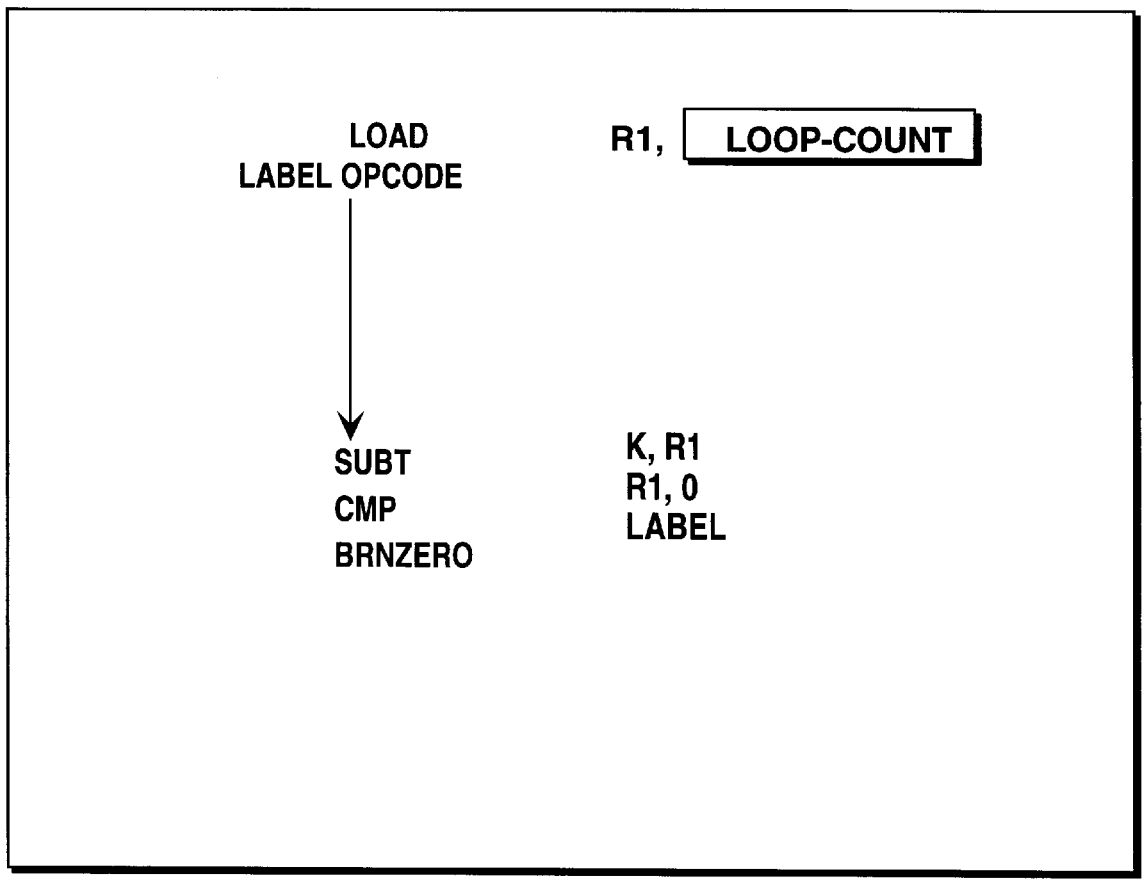
FIG. 5b lists a count down program loop that counts by subtracting a constant.

Many variations on the loops of FIGS. 4a and 4b exist. FIGS. 5a and 5b illustrate two possible variations. The program loops of FIGS. 5a and 5b add and subtract, respectively, a constant K from the register used as the loop counter. To fill in the final loop count field with such program loops, the final count should be set as follows $$\text{Final Count} = \frac{\text{LOOP\_COUNT}}{K}$$

Where LOOP_COUNT is the immediate value used to compare the register to when performing the loop end check and K is the constant that is added to or subtracted from the loop counter register.

Examples of such instruction sequences taken from compiled Intel Architecture programs are listed below:

inc % edi; 1. cmp % ebp, % edi; j1 .L5 addl $4, % edi; j1 .l2 addl $4, % edx; cmpl $40, % edx; jb .L4

One or more of these typical instruction sequences can be looked for in program code. These would be either the most common existing loop code sequences or loop code sequences that would be recommended by the processor manufacturer for efficient loop code generation. Compiler designers could develop compilers that would use the recommend loop instruction sequences.

3. Loop Count Location with Architectural Support

Determining the current loop count by specifically identifying a location of a loop count value using architectural support was also examined. If the location of the loop count is known prior to loop execution, then the loop count is available up-front and the exit condition of the loop can be calculated in advance such that no branch mispredictions will occur for the sequence of loop instructions.

Since this approach would benefit only loops that are counter based, our study of the SPEC benchmark programs measured the percentage of counter-based loops among all loops using compiler generated instrumentation. The results are provided below:

| Percentage of counter based loops | | |
|---|---|---|
| SPEC Program | all loops | all branches |
| compress | 42.64% | 6.68% |
| eqntott | 97.09% | 35.36% |
| espresso | 71.15% | 14.27% |
| gcc | 49.71% | 7.08% |

| Percentage of counter based loops | | |
|---|---|---|
| SPEC Program | all loops | all branches |
| li | 0.00% | 0.00% |
| sc | 17.61% | 1.31% |
| ear | 99.70% | 17.95% |
| alvinn | 100.00% | 0.11% |
| mean | 46.37% | 10.78% |

As can be seen from the preceding table, about 50% of the loops in C language integer codes are counter based. Thus, a counter based branch prediction system would provide great improvement to an existing branch prediction system.

Two different method of architectural support have been proposed: a compiler generated hint bit and a specific hint instruction. Each scheme was examined and the results are summarized below.

Providing a compiler generated hint bit involves informing the hardware that a specific branch ends a loop and is thus predicted best by a counter based scheme. The results of testing a hint bit based scheme did not significantly improve the prediction beyond the numbers above. In our measurements we used the compiler to identify loops, so we already had that information, and could apply it only to loops.

A hint instruction providing the loop count location has more potential than a single hint bit. A hint instruction, generated by the compiler and inserted before each counter based loop can provide the location of the loop counter and enable near perfect prediction for the loop. As can be seen from the table above, about 50% of the loops in C language integer codes are counter based. However, given the small percentage of branches that are loop related (8.5% for single exit loops, 17.64% for all loops), even perfect prediction on counter based loops will yield an improvement of less then 0.5% in the overall prediction rate.

Different methods can be used to implement a hint instruction for capturing the loop count via information provided explicitly in the instruction stream. Each method will be examined individually.

A specific hint instruction that provides either the location or the value of the loop count can be added to the processor instruction set. This type of instruction is very explicit and easy to implement. However, it adds an instruction to the instruction stream that does nothing more than provide the branch prediction mechanism with a hint.

A specific loop branch instruction with loop count information can be added to the processor instruction set. This instruction would perform the combined task of hinting the branch prediction mechanism and branching back.

Semantic meaning can be added to another (for example—compare) instruction that is involved in a program loop. For example, a bit can be added to an instruction.

This technique of adding a hint instruction to the instruction set has the potential of providing the most accurate indication of the loop count. Since both the location and thus the value of the loop count for the current instance are precisely known, there is no reliance on a previously used count. It can be inserted in places where the potential penalty of a mispredicted branch outweighs the cost of handling an additional instruction.

The proposed architectural support should not be confused with specific loop instructions that exist in various architectures and combine management of the counter and a conditional branch in a single instruction. Instructions such as the Branch on Lcc and Add (BLA) in the instruction set of the Intel i860® Architecture, the Branch Conditional to Count Register (BCCTRx) in the instruction set of the Motorola PowerPC® Architecture, and the Loop instruction in the set of the Intel 80x86 Architecture are typical examples. While these instructions help in reducing the path-length, they do not obviate the need for predicting the loop exit condition. As the exit condition is resolved at the execution stage of the pipe, a pipeline bubble is in most cases unavoidable without branch prediction. They can however aid the counter based predictor in locating the loop count location. As such they fall under either the second or the third scheme since they can be looked at as either an easily detected instruction sequence or as containing a branch hint.

Figure 6:
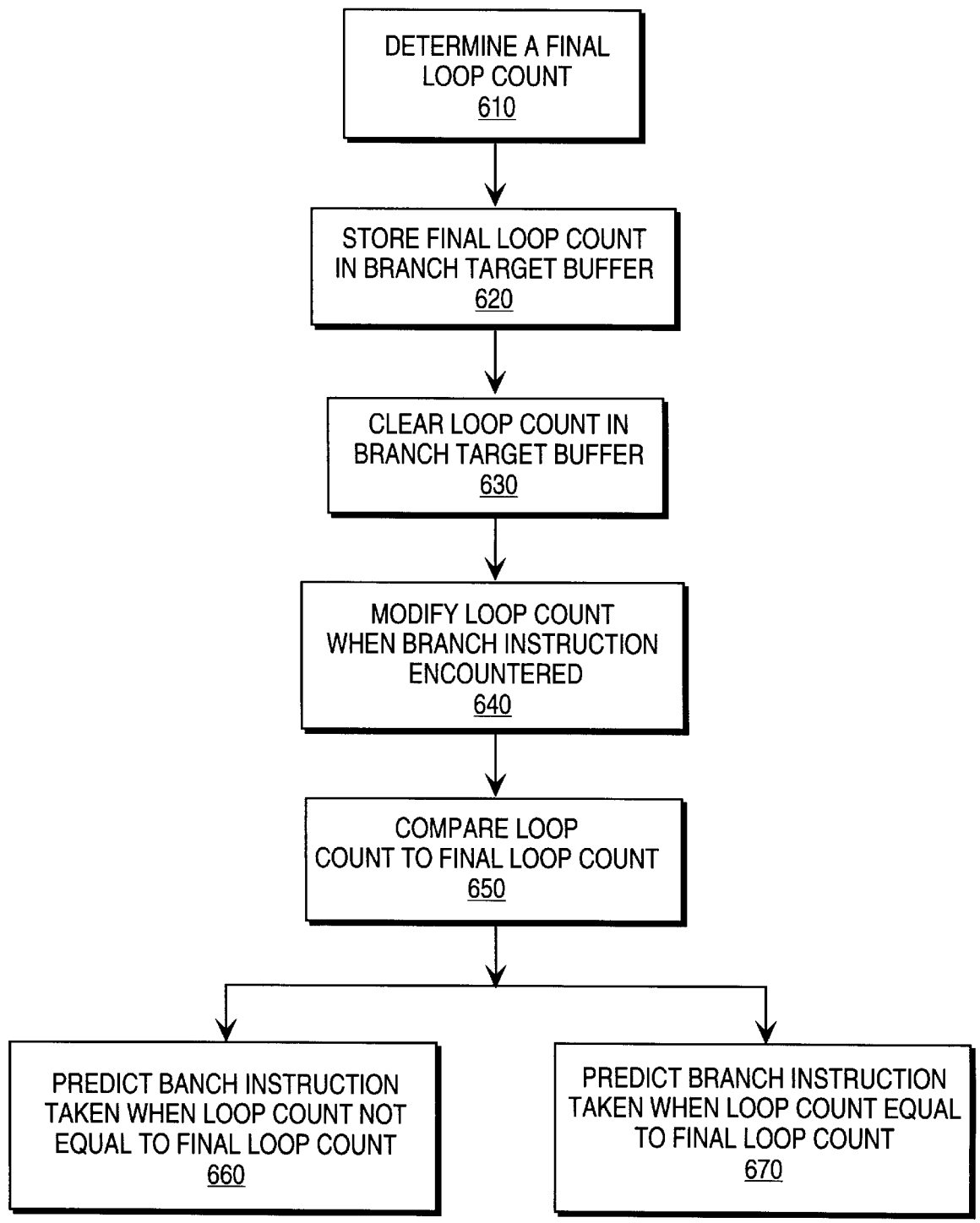
FIG. 6 illustrates the method of predicting branch instructions.

FIG. 6 illustrates the method of predicting branch instructions. The first step, step 610, is to determine a final loop count. The final loop count is the number of iterations a loop performed during an earlier loop execution. The next step is to store the final loop count in the branch target buffer at step 620. The final loop count will be used during the next branch execution. Then, at step 630, the loop count in the branch target buffer is cleared. At step 640, the loop count is modified when the branch instruction is encountered. The loop count is used during branch execution to count the number of iterations that have occurred. The loop count is compared to the final loop count at step 650. This comparison allows the branch prediction mechanism to determine whether the loop has performed the predicted number of iterations. Then at step 660, the branch prediction mechanism predicts the branch instruction taken when the loop count is not equal to the final loop count. If the loop count and final loop count are not equal, then the loop has not completed the predicted number of loop iterations and the loop continues to execute. At step 670, the branch prediction mechanism predicts the branch instruction taken when the loop count is equal to the final loop count. If the loop count and final loop count are equal, then the loop has completed the predicted number of loop iterations and the loop is exited.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method improving the prediction of branch instructions with program loops in a pipelined computer microprocessor, said microprocessor containing a branch prediction mechanism that predicts which instructions should be fetched after a branch instruction, and said mechanism utilizing a branch target buffer, wherein sad method comprising the steps of:

determining a final loop count for a loop based branch instruction, said final loop count comprising a number of loop iterations;

storing said final loop count in a branch target buffer;

clearing a loop count in said branch target buffer;

modifying said loop count when said loop based branch instruction is encountered;

comparing said loop count to said final loop count;

predicting said loop based branch instruction taken when said loop count does not equal said final loop count; and predicting said loop based branch instruction not taken when said loop count equals said final loop count.

2. The method as claimed in claim 1 wherein said step of determining a final loop count comprises dynamic run-time determination of said final loop count.

3. The method as claimed in claim 1 wherein said step of determining a final loop count comprises run-time determination of a memory location containing a final loop count.

4. The method as claimed in claim 1 wherein said step of determining a final loop count comprises using a hint bit that identifies a branch instruction as implementing a program loop, wherein said hint bit informs the branch target buffer that said branch instruction is best predicted by a counter based prediction scheme.

5. The method as claimed in claim 1 wherein said step of determining a final loop count comprises identifying a branch instruction as implementing a program loop with a hint instruction.

6. A branch target buffer for predicting branch instructions, said branch target buffer comprising:

a tag address field, said tag address field identifying location of a branch instruction in memory;

a target address field, said target address field specifying address that program will branch to if said branch instruction is predicted taken;

a final loop count field, said final loop count field containing a number of loop iterations; and a counter field, said counter field storing a current number of loop iterations.

7. The branch target buffer as claimed in claim 6 further comprising:

a branch history field, said branch history field storing a history of branch results; and a branch type field, said branch type field specifying if said branch instruction implements a program loop.

* * * * *

UNITED STATES PATENT AND TRADEMARK OFFICE
CERTIFICATE OF CORRECTION

PATENT NO. : 5,909,573
DATED : June 1, 1999
INVENTOR(S) : Sheaffer

It is certified that error appears in the above-identified patent and that said Letters Patent is hereby corrected as shown below:

Column 5,
Line 21, delete "either".

Column 7,
Line 34, before "cmp", delete "1."

Column 10,
Line 1, delete "sad" and insert -- said --.

Signed and Sealed this

Sixth Day of July, 2004

JON W. DUDAS
*Acting Director of the United States Patent and Trademark Office*